United States Patent [19]

Rizzo

[11] 4,245,945

[45] Jan. 20, 1981

[54] PIPELINE SCRAPER HANDLING APPARATUS

[75] Inventor: Luke J. Rizzo, White Oak, Tex.

[73] Assignee: Sun Pipe Line Company, Tulsa, Okla.

[21] Appl. No.: 46,397

[22] Filed: Jun. 6, 1979

[51] Int. Cl.[3] .............................................. B65G 67/12

[52] U.S. Cl. .................................... 414/349; 414/352; 414/391; 414/396; 414/400; 414/495; 414/559; 414/589

[58] Field of Search ............... 414/395, 396, 401, 495, 414/559, 589, 745–747, 349, 352, 391, 400; 280/47.26, 79.3, 789; 296/1 A, 3, 182; 134/201; 105/362, 380; 248/49, 669

[56] References Cited

U.S. PATENT DOCUMENTS

| | | | |
|---|---|---|---|
| 2,720,414 | 10/1955 | Hart | 296/3 X |
| 2,867,334 | 1/1959 | Aiken et al. | 414/589 |

*Primary Examiner*—Andres Kashnikow
*Attorney, Agent, or Firm*—J. E. Hess; Donald R. Johnson; James H. Phillips

[57] ABSTRACT

In order to facilitate the retrieval and launching of a pipeline scraper, as well as intermediate handling including transportation and cleaning, a trailer-mounted cradle apparatus is employed. The cradle is vertically adjustable to accomodate different heights of incoming and launching traps. An integral reel and cable unit is provided to assist in pulling a scraper from an incoming trap into the cradle and, optionally, to start the scraper into a launching trap.

3 Claims, 4 Drawing Figures

PIPELINE SCRAPER HANDLING APPARATUS

BACKGROUND OF THE INVENTION

Figure 3:
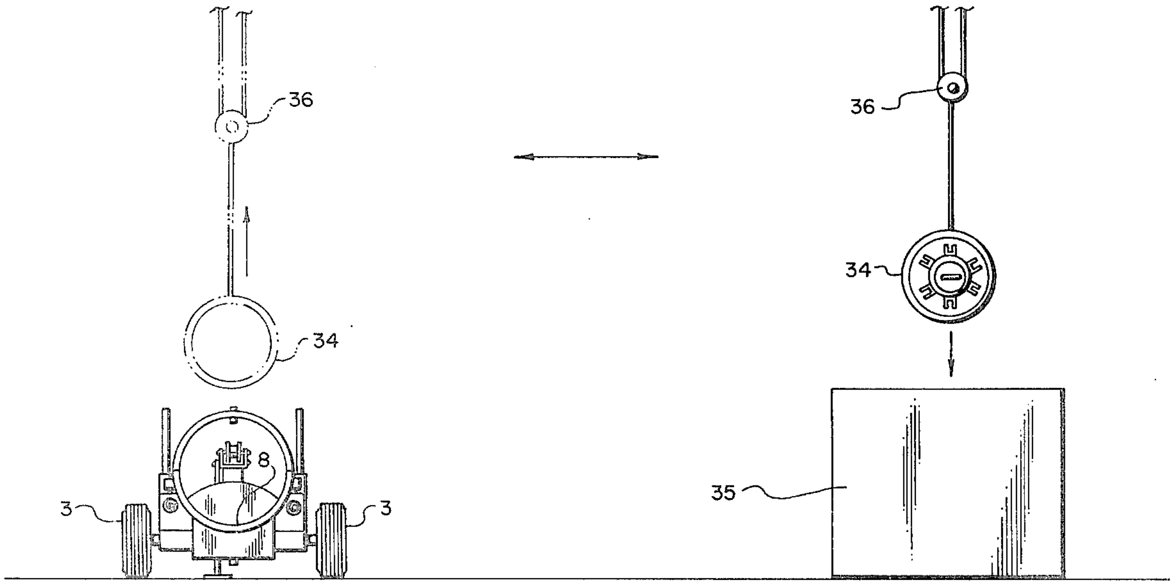

This invention relates to the pipeline maintenance art and, more particularly, to apparatus for handling a pipeline scraper.

Pipeline scrapers are periodically (more often in the summer than in the winter) introduced into pipelines to be conveyed, along with the transported fluid, through the pipeline from one pump station to the next. These scrapers (sometimes called "pigs") serve to remove coatings of paraffin and other undesirable material from the inner walls of the pipeline in order to maintain its capacity and efficiency. It is notoriously well understood, by those skilled in the art, that, upon reaching an exit position, the scraper is remarkably messy and, as such, is difficult and disagreeable to handle. Before being reintroduced into the line for cleaning the section of pipe to the next pump station, the scraper must be cleaned, usually by boiling it in a vat.

While handing small scrapers is not a particularly difficult task, and can be carried out manually, those skilled in the art appreciate that scrapers may be as large as sixty inches in diameter and, with an accumulated load of paraffin and the like, may weigh several hundred pounds. Handling of large scrapers has generally been carried out manually by using local hoists at the receiving and launching traps and at the vat site in conjunction with a general purpose truck or trailer to effect transportation.

Thus, those skilled in the art will appreciate that it would be highly desirable to provide means for efficiently receiving, transporting, cleaning, and launching a scraper while avoiding, to a considerable extent, the heavy labor and extra-ordinary mess ordinarily associated with this task.

It is therefore a broad object of my invention to provide improved scraper handling means.

It is another object of my invention to provide such scraper handling means which can readily accomodate the different heights of incoming and launching traps.

It is a more particular object of my invention to provide such scraper handling means which comprises a unitary vehicle having a height-adjustable cradle for receiving, transporting, and launching a scraper and which further provides for easy access to the cleaning vat using a single hoist.

BRIEF DESCRIPTION OF THE INVENTION

Briefly these and other objects of the invention are achieved by providing a wheeled vehicle having a sturdy frame which is generally rectangularly shaped and has vertical support members upstanding from each of its four corners. An elongated cradle, of generally semi-circular cross-section, slideably engages the support members by the provision of complementarily positioned sleeves shaped and dimensioned to fit closely over the support members. Thus, the vehicle may be configured with the cradle fixed alternatively in a lower, scraper-receiving position and an upper, scraper-launching position. Reel and cable means disposed forward of the cradle may be employed to pull the scraper out of an incoming trap and into the cradle.

Figure 1:
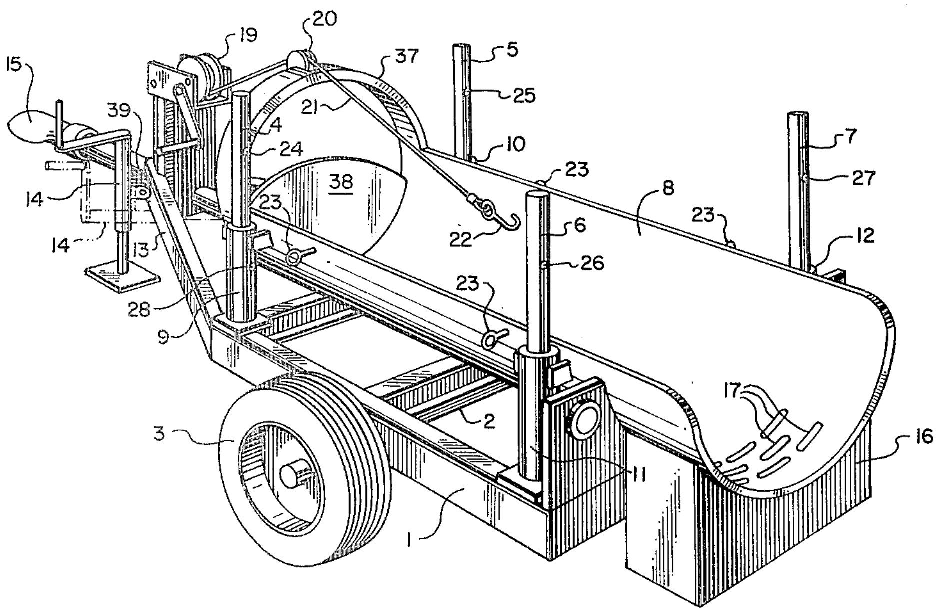

The subject matter of the invention is particularly pointed out and distinctly claimed in the concluding portion of the specification. The invention, however, both as to organization and method of operation, may best be understood by reference to the following description taken in conjunction with the accompanying drawing of which:

FIG. 1 is a rear three-quarter pictorial view of the vehicle comprising the present invention and illustrating the various components thereof;

FIG. *2a* illustrates the vehicle configured for scraper receiving;

FIG. *2b* illustrates the vehicle configured for scraper launching; and

FIG. 3 illustrates the manner in which a scraper may be handled from the vehicle for reconditioning prior to reloading into the vehicle for subsequent transportation.

Referring now to FIG. 1, the relationship of the various components constituting the vehicle of the present invention may best be understood. A very sturdy frame 1 is supported on an axle 2 which, in turn, carries terrain-engaging wheels 3. The frame 1 is generally rectangular and is provided with vertically oriented support members 4, 5, 6, 7 disposed at the four frame corners. An elongated cradle 8 having an arcuate cross-section (semi-circular along all but the forwardmost portion of its length) carries outwardly disposed sleeve members 9, 10, 11, 12 welded to its outside surface. The sleeve members 9, 10, 11, 12 are vertically oriented and positioned and dimensioned to closely slip over the vertical support members 4, 5, 6, 7 such that the entire cradle assembly may be adjustably positioned vertically with respect to the frame 1. The reasons for providing such vertical adjustment will be discussed below.

In FIG. 1, the cradle 8 is depicted in its lower-most position in which the sleeve members 9, 10, 11, 12 are resting on the frame 1. The vertical support members 4, 5, 6, 7 are provided with diametrically disposed apertures 24, 25, 26, 27 and such apertures are alignable with corresponding apertures in the sleeve members 9, 10, 11, 12 when the cradle 8 is raised to an alternate vertical position. For example, the aperture 28 in the vertical sleeve member 9 may be brought into alignment with the aperture 24 in the vertical support member 4 when the cradle 8 is raised to a higher position, and it will be understood that corresponding apertures (out of view in FIG. 1) are provided in the sleeve members 10, 11, and 12. As will be discussed below, the cradle 8 may be fixed in a higher position than that shown in FIG. 1 by inserting appropriate pins through aligned apertures in the vertical support members and sleeves.

A forward extension 13 of the frame 1 terminates in conventional trailer coupling means 15 whereby the vehicle may be attached to be towed by a powered vehicle in the usual manner. A jack 14 is provided near the forward end of the extension 13 to stabilize the vehicle horizontally when it is not connected to a towing vehicle. It may be noted that the jack 14, by virtue of its adjustable nature, provides a range of positions about the true horizontal around the axle 2. During towing, the jack 14 may be stowed by rotating it into its alternate horizontal position about the hinges 39 as illustrated in phantom in FIG. 1.

A cable 21, terminated at its free end in a hook member 22, passes over a pulley 20, which is disposed on a fully circular section 37 of the cradle 8, to a reel assembly 19. The cable and reel are employed to pull a scraper from an incoming trap into the cradle 8 as will be explained more fully below. An end baffle 38 at the forward end of the cradle 8 limits the forward position of a scraper carried by the vehicle. A pair of eyelets 23 is provided on each side of the cradle to suspend chains which may be utilized to raise and lower the cradle in a manner to be described below.

Figure 2B:
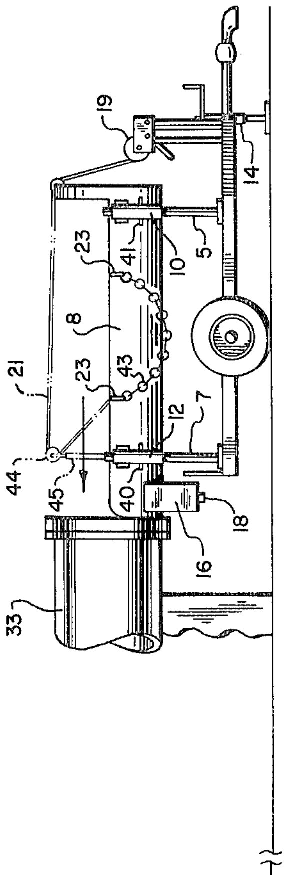
Figure 2A:
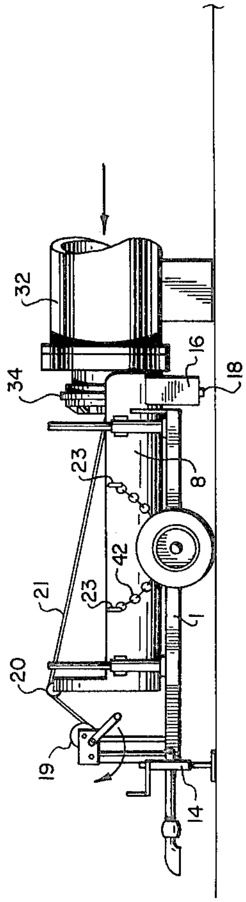

FIGS. 2*a* and 2*b* illustrate, respectively, use of the vehicle at incoming and launching traps. Referring to FIG. 2*a*, it will be noted that the incoming trap 32 is positioned lower than the launching trap 33 (FIG. 2*b*) in accordance with normal practice in pipeline operations. With the door to the incoming trap 32 open, the cable 21 may be attached to the nose of the scraper 34 which is then pulled into the cradle 8 by winding the cable 21 onto the reel assembly 19. Any residual liquid material transferred with the scraper 34 into the cradle 8 drains through the apertures 17 (FIG. 1) into the reservoir 16 which may be emptied as necessary by removing the drain plug 18.

After the scraper is reconditioned as described below, it is returned to the cradle 8, now positioned in its higher vertical position, for transfer to the launching trap 33 as shown in FIG. 2*b*. The cradle 8 is held in its upper position by pins 40, 41 inserted through the apertures 25, 27 (FIG. 1) and apertures in the sleeve members 10 and 12 aligned therewith. It will be understood, of course, that a corresponding pair of pins is employed on the vertical side out of view in FIG. 2*b*.

While the scraper may be pulled toward the launching trap 33 by providing, in conjunction with the cable 21 and reel means 19, a supplementary pully 44 mounted upon an auxiliary support 45 (which may simply be inserted into the vertical support member 7) as depicted in phantom in FIG. 2*b*, it has been found in practice that the scraper may be readily introduced into the launching trap 33 by simply shoving it in with a push piece such as a 2×4 board or the like.

The scraper, after being withdrawn from the incoming trap 32 is illustrated in FIG. 2*a* and before being transported to the launching trap 33 as illustrated in FIG. 2*b*, must be reconditioned, and additionally, the cradle 8 of the vehicle must be raised to the launching position. These tasks may be carried out, as shown in FIG. 3, by simply towing the vehicle to the site of a hoist 36 mounted on any suitable travelling means such that the scraper 34 may be lifted from the cradle 8 and dropped into a boiling vat 35 in which the accumulated coating of paraffin, tar, etc., is boiled off. Referring again briefly to FIGS. 2*a* and 2*b*, it will be noted that chains 42, 43 are suspended on each side of the cradle 8 between eyelets 23. These chains may be brought together over the cradle 8 and attached, at their midpoints, to the hoist 36 which is then used to raise the cradle 8 and fix it into the launching position shown in FIG. 2*b*. As previously noted, the launching position is maintained by inserting pins into aligned apertures in the vertical support members 4, 5, 6, 7, and the sleeves 9, 10, 11, 12. It will be understood, of course, that if it is necessary that one vehicle be employed to handle scrapers from receiving and launching traps which are situated at varying heights above the terrain, appropriate sets of alignable apertures may be provided in the support members and the sleeves. Additionally, aperture sets (and the bottoms of the sleeves) may be vertically distributed such that, in a scraper-receiving position, the forward end of the cradle is slightly lower than the rearward end to assist in transferring a scraper from an incoming trap into the cradle. Similarly, in a launching position the forward end of the cradle may be situated slightly higher than the rearward end to facilitate sliding the scraper into the launching trap.

After the cradle 8 has been raised to the launching position and the scraper 34 has been boiled out, the scraper 34 may be retransferred back into the cradle 8 and the vehicle hauled to the launching trap 33 for further service. As a practical matter, more than one scraper may be on hand such that a previously cleaned scraper may be placed into the cradle 8 as soon as it has been raised to the launching position to continue the line-cleaning operation. At the terminal station, if necessary, the scraper may be hauled back to the initial pump station in the subject vehicle.

To lower the cradle 8 back to the scraper receiving position depicted in FIG. 2*a*, it is only necessary to take up the cradle weight with a hoist hooked to the chains 42, 43 and withdraw the pins from the aligned apertures in the support members and sleeves.

It has been found that the cradle 8 may be economically fabricated from a scrap length of pipe of the same size or preferably a little larger than the size of pipe the scraper services. By way of example, a 30 inch scraper may readily be accomodated in a cradle fabricated from a length of 36 inch pipe.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from these principles.

What is claimed is:

1. A scraper handling vehicle for receiving, transporting, and launching a pipeline scraper comprising:

(A) a frame having first, second, third, and fourth corners, said frame including means forwardly extending from said first and second corners for coupling to a self-propelled vehicle to effect towing;

(B) axle means supporting said frame;

(C) at least one pair of wheels carried by said axle means and oriented for rolling contact with the terrain;

(D) first, second, third, and fourth vertical support members upstanding, respectively, from said first, second, third, and fourth frame corners;

(E) a cradle assembly including an elongated cradle with a forward end and a rearward, scraper-receiving end, said cradle having an arcuate cross-section with a dimension at least one-half the nominal diameter of a scraper to be handled, an end baffle disposed across said forward end of said cradle to limit the forward position of a scraper carried therein, said cradle assembly further including first, second, third, and fourth vertically oriented sleeve means affixed to said cradle and distributed and configured to fit over and slideably engage, respectively, said first, second, third, and fourth support members;

(F) means for selectively fixing said cradle assembly in scraper-receiving and scraper-launching alternative vertical positions, said fixing means comprising alignable apertures provided, respectively, in predetermined vertical positions of said first, second, third, and fourth vertical support members and said first, second, third, and fourth sleeve members, said fixing means further comprising first, second, third, and fourth pin means for insertion into said alignable apertures to fix said cradle assembly in a vertical position;

(G) means adapted for removably coupling external vertical hoist means to said cradle assembly to facilitate adjusting the vertical position of said cradle assembly with respect to said frame; and (H) reel means fixed to said forwardly-extending means and a cable wound on said reel means for payoff and take-up, said cable being terminated at its free end with connecting means adapted for attachment to the nose of a scraper in an incoming scraper trap such that the scraper can be pulled into said cradle by taking up said cable onto said reel means.

2. The scraper handling apparatus of claim 1 which further includes a jack affixed by pivotal mounting means to said forwardly-extending means, said pivotal mounting means being adapted to provide alternate storage and functional positions for said jack, said jack, in said functional position, providing a vertical range of support to said forwardly extending means with respect to the terrain.

3. The scraper handling apparatus of claim 1 or 2 in which said cradle assembly further includes drain and reservoir means, respectively, through and beneath said cradle, for collecting residual fluid drained from a scraper pulled from an incoming trap.

* * * * *